Dec. 30, 1958     E. J. PETRICK, SR     2,866,418
SCALE MODEL DRIVEN ROAD VEHICLE AND ROAD
Filed Jan. 7, 1954     11 Sheets-Sheet 1
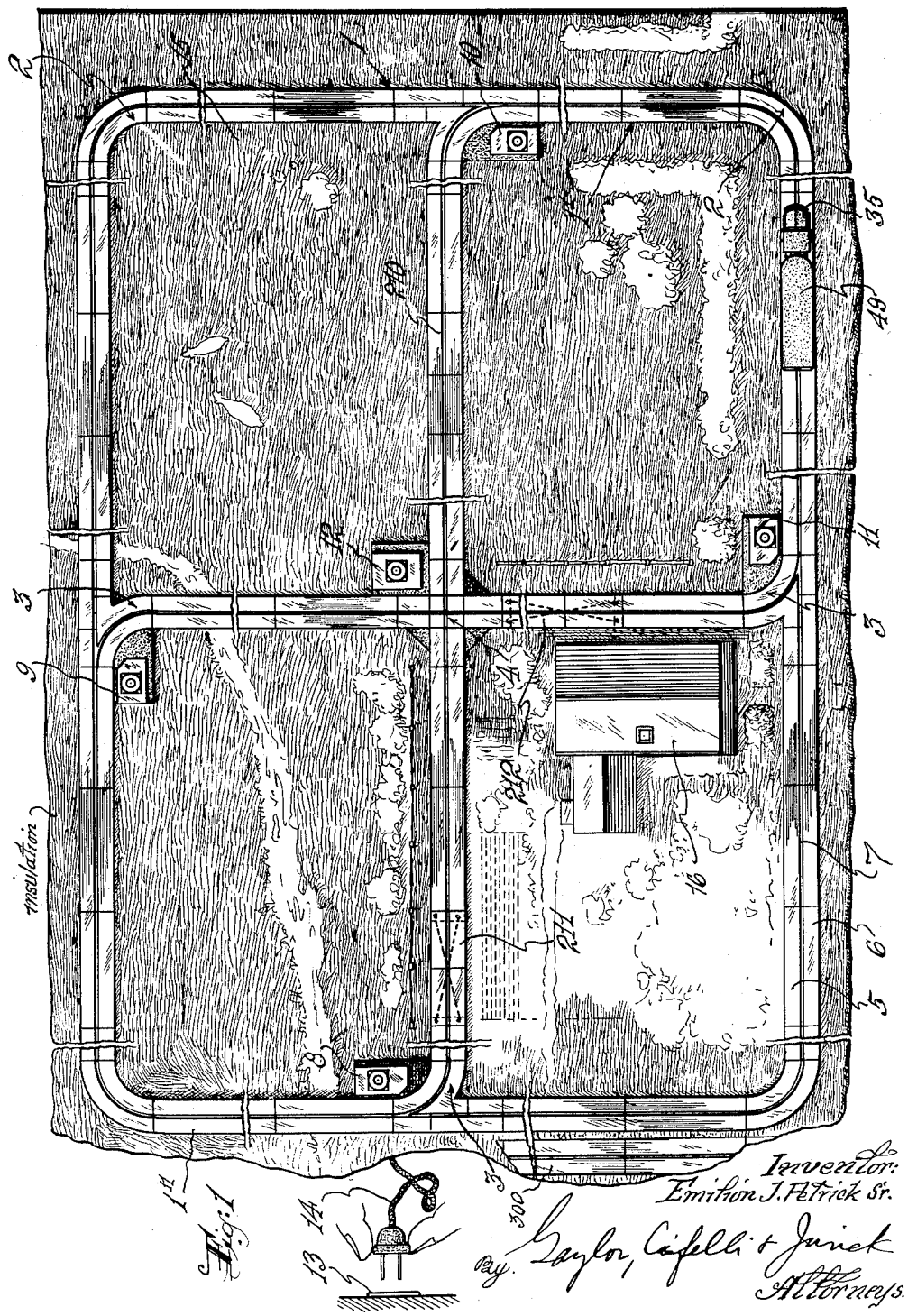

Dec. 30, 1958   E. J. PETRICK, SR   2,866,418
SCALE MODEL DRIVEN ROAD VEHICLE AND ROAD
Filed Jan. 7, 1954   11 Sheets-Sheet 2
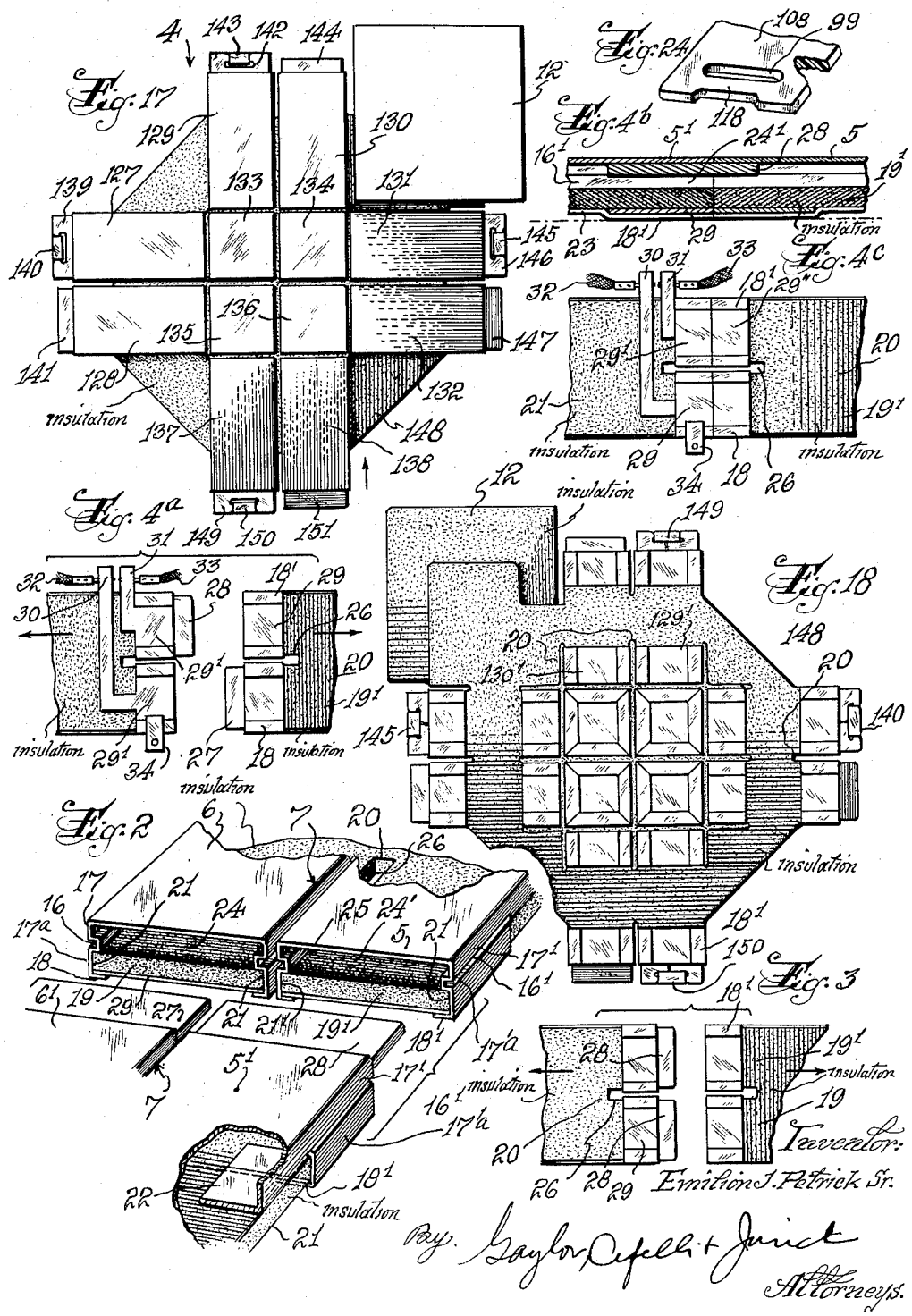

Dec. 30, 1958  E. J. PETRICK, SR  2,866,418
SCALE MODEL DRIVEN ROAD VEHICLE AND ROAD
Filed Jan. 7, 1954  11 Sheets-Sheet 3
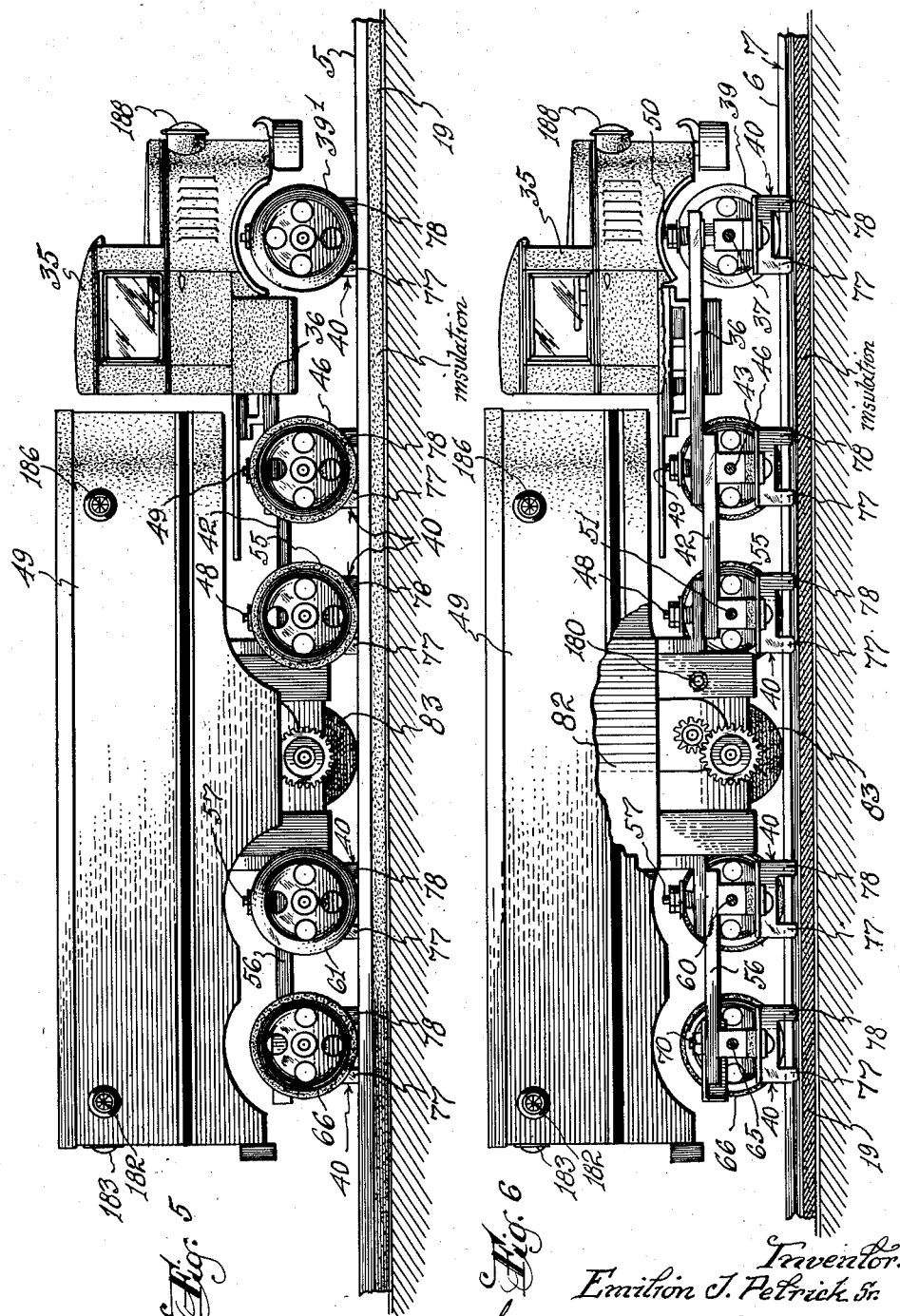

Dec. 30, 1958 E. J. PETRICK, SR 2,866,418
SCALE MODEL DRIVEN ROAD VEHICLE AND ROAD
Filed Jan. 7, 1954 11 Sheets-Sheet 4
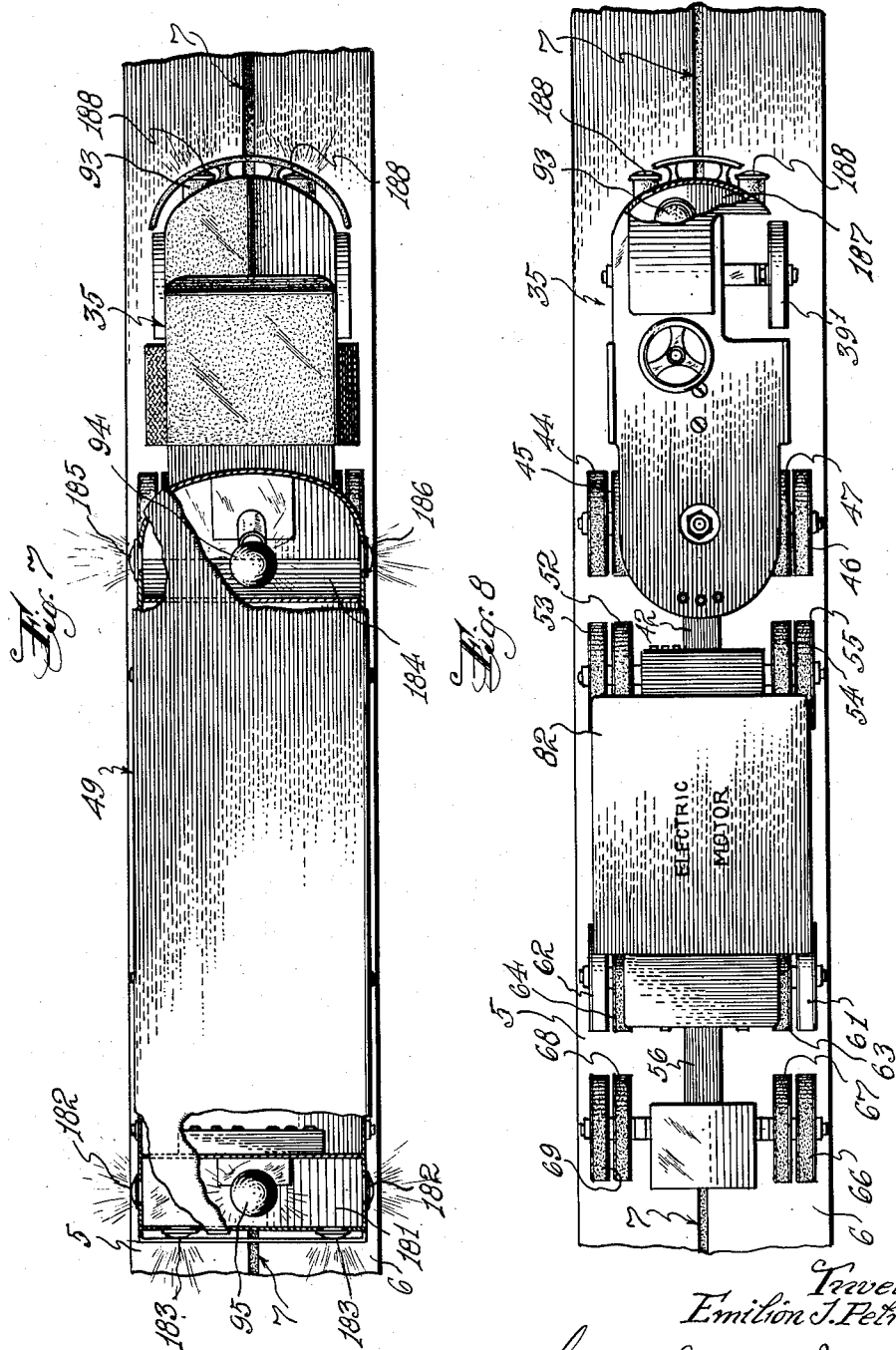

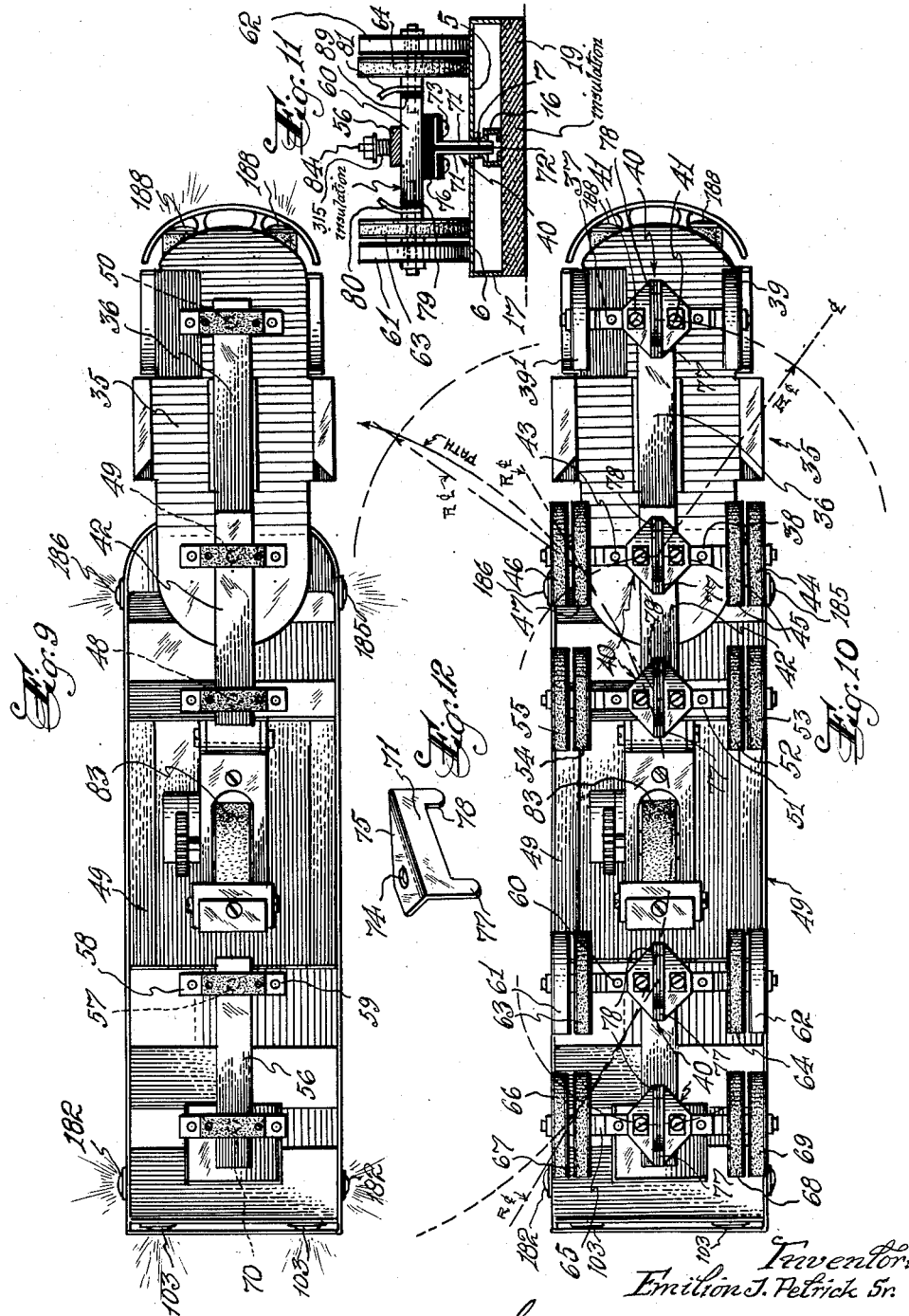

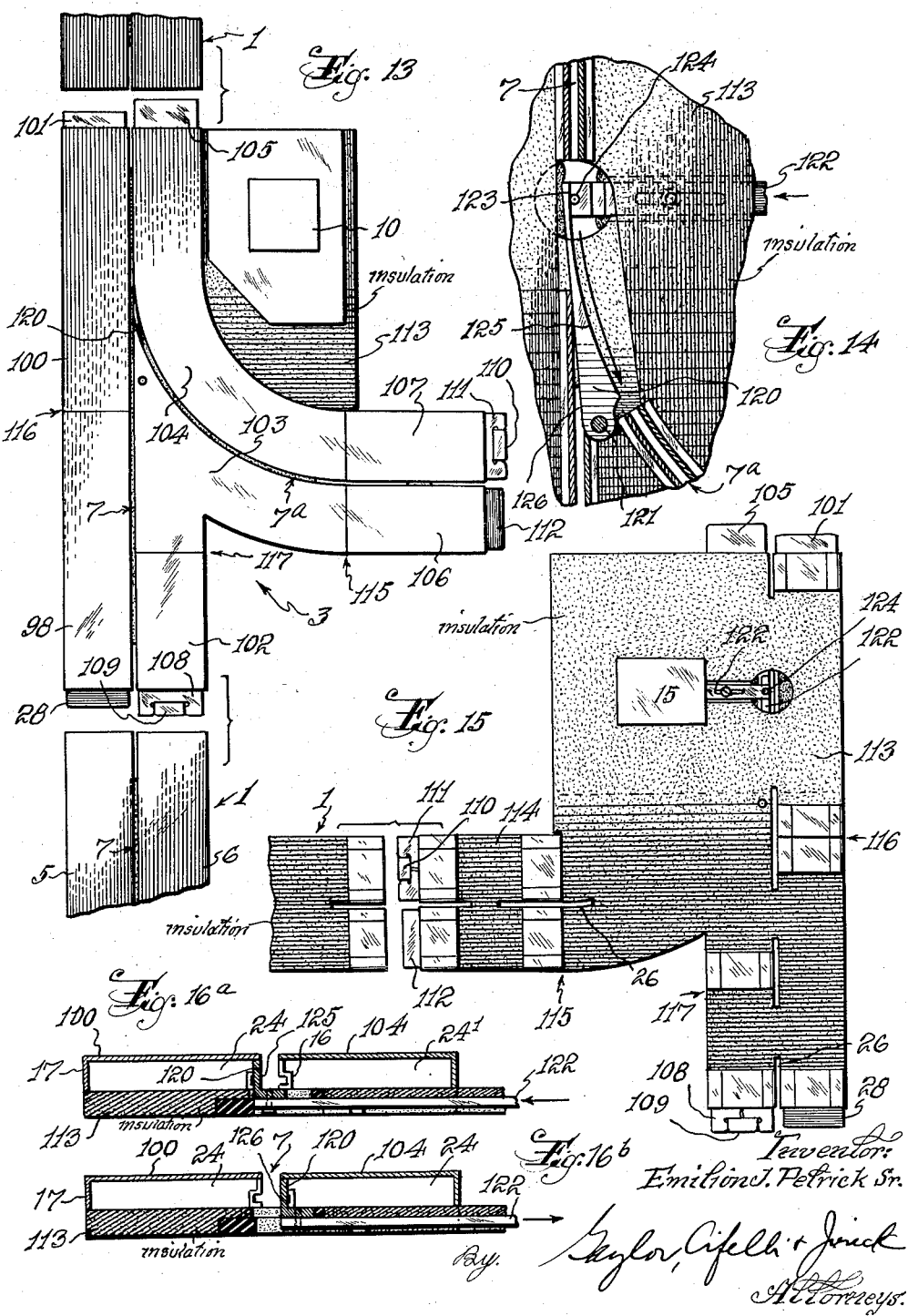

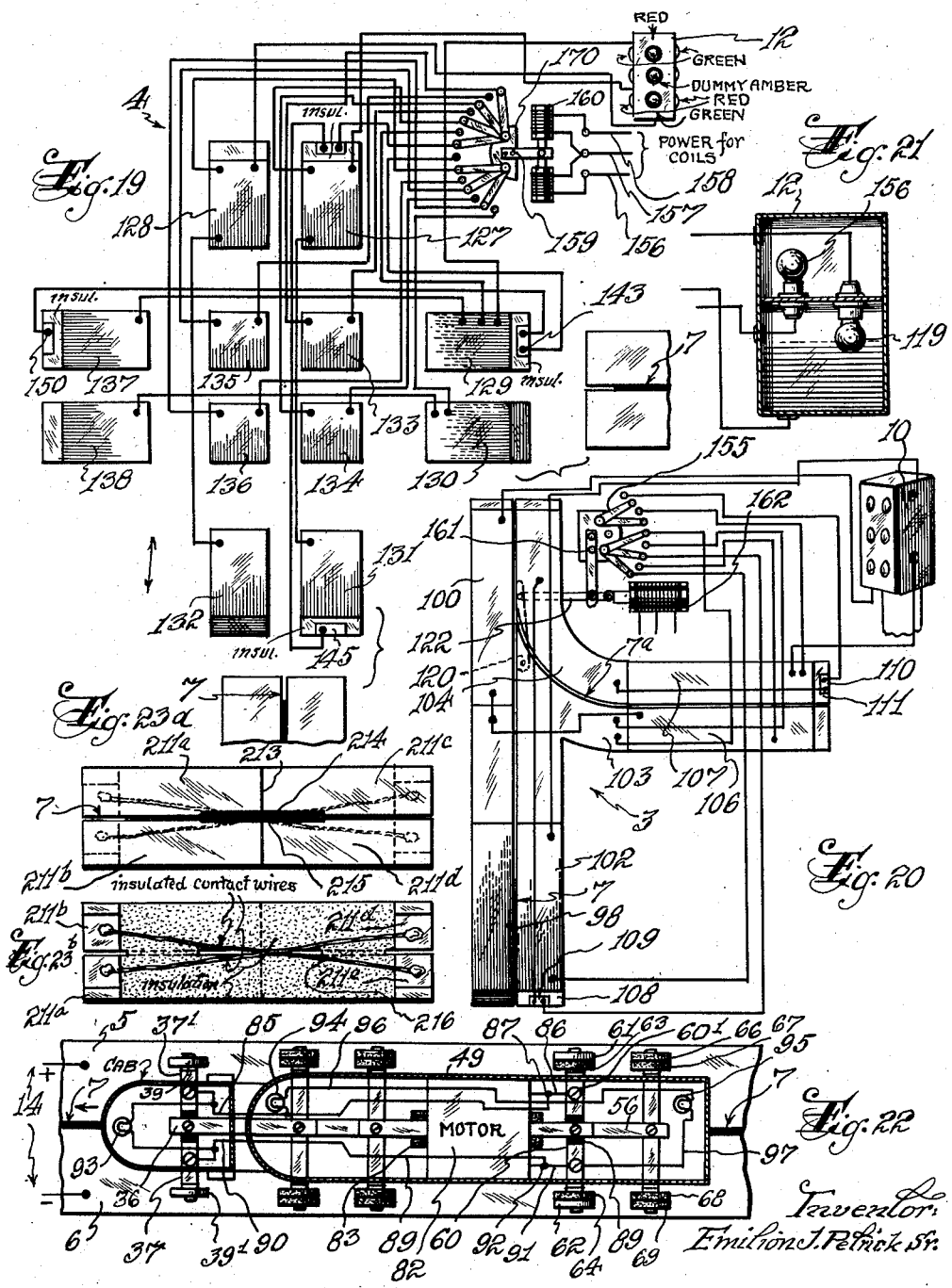

Dec. 30, 1958   E. J. PETRICK, SR   2,866,418
SCALE MODEL DRIVEN ROAD VEHICLE AND ROAD
Filed Jan. 7, 1954   11 Sheets-Sheet 8
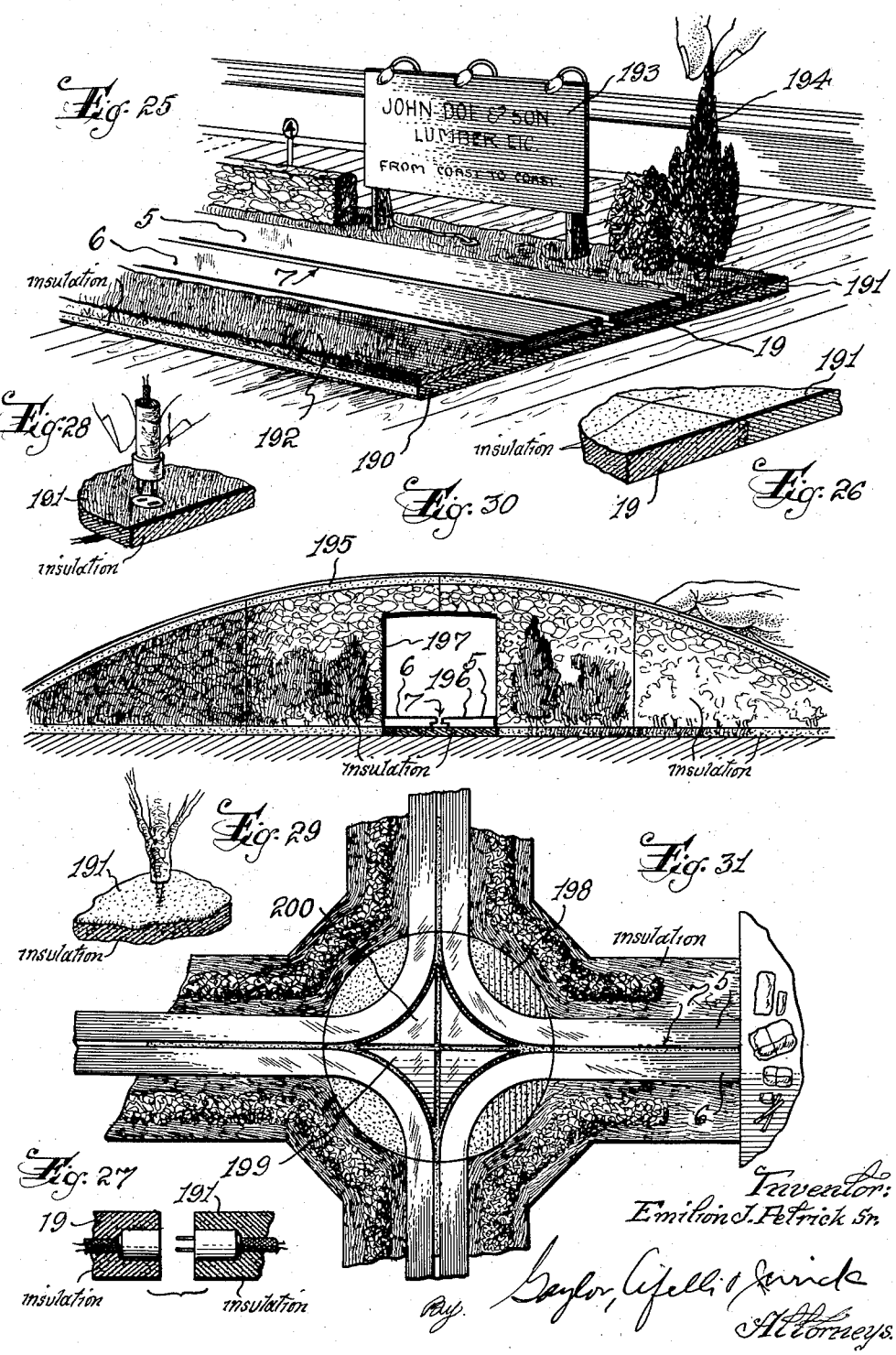

Dec. 30, 1958     E. J. PETRICK, SR     2,866,418
SCALE MODEL DRIVEN ROAD VEHICLE AND ROAD
Filed Jan. 7, 1954     11 Sheets-Sheet 9
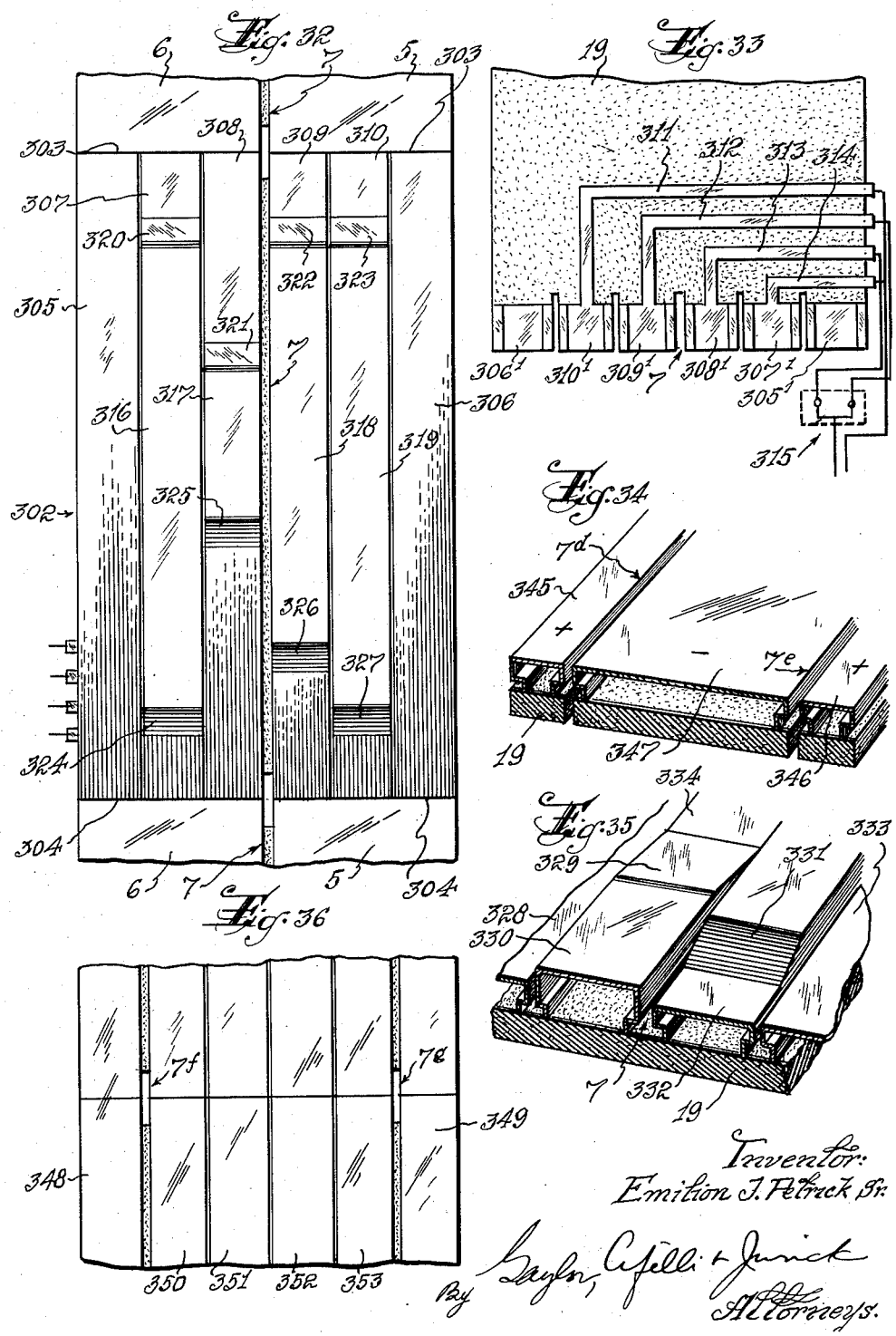

Dec. 30, 1958 E. J. PETRICK, SR 2,866,418
SCALE MODEL DRIVEN ROAD VEHICLE AND ROAD
Filed Jan. 7, 1954 11 Sheets-Sheet 10
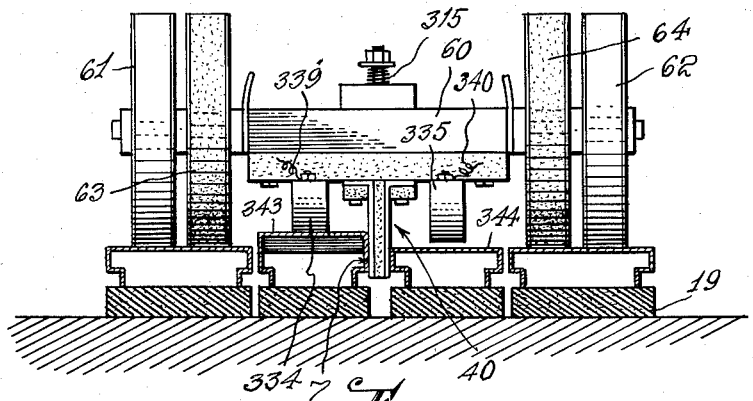
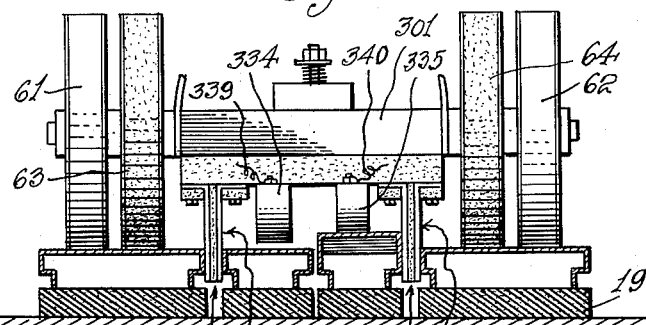
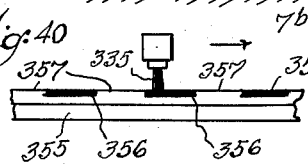
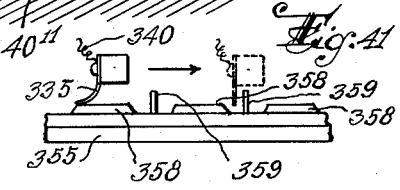
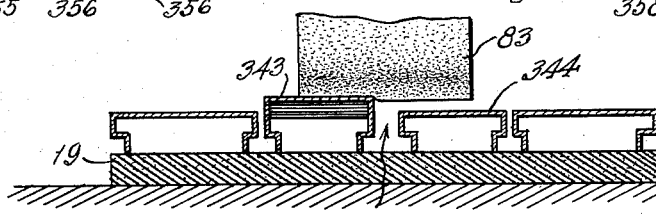
Inventor:
Emilion J. Petrick Sr.

Dec. 30, 1958      E. J. PETRICK, SR      2,866,418
SCALE MODEL DRIVEN ROAD VEHICLE AND ROAD
Filed Jan. 7, 1954      11 Sheets-Sheet 11
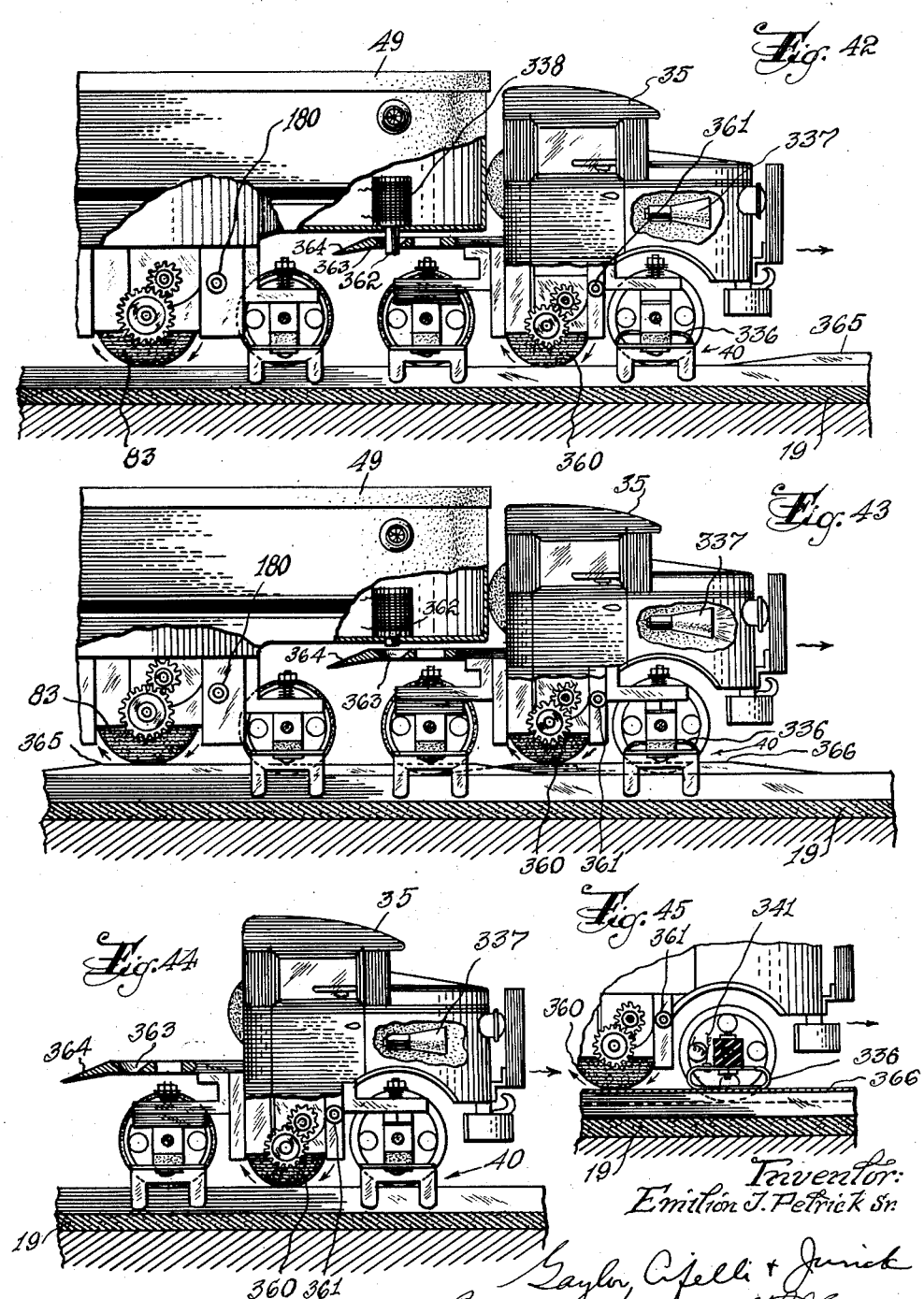

United States Patent Office

2,866,418
Patented Dec. 30, 1958

2,866,418

SCALE MODEL DRIVEN ROAD VEHICLE AND ROAD

Emilion J. Petrick, Sr., Newark, N. J.

Application January 7, 1954, Serial No. 402,629

8 Claims. (Cl. 104—149)

The present invention deals with automotive-type toy or scale model vehicles driven on a flat roadbed by mechanical or electrical means. More specifically, it relates to automotive type toy vehicles having one or more centrally disposed guide means projecting underneath the chassis of the vehicle below the level of the simulated roadbed, and preferably a substantially flat roadbed, separated in the middle by an air space, with the guide means riding in said air space portion.

Toy road vehicles have been described in the art, although apparently none has appeared commercially. Most of the difficulties encountered in prior art systems of the type dealt with herein center around the guide means which should be simple, yet effective in allowing maneuverability and ready removal of the vehicle from the roadbed, as well as the road structure, the type of drive employed for traction, crossings which require simplicity and reliability, etc.

The invention may be more readily understood by reference to the accompanying drawings in which Figure 1 illustrates one proposed complete highway system and one vehicle riding thereon. Figure 2 is a partially cutaway perspective view of a portion of the roadbed giving details and method of joining together road section ends. Figures 3, 4a, 4b and 4c depict fragmentary details of the roadbed and connections thereof. Figure 5 is a side view and Figure 6 is a side view, partially cut away, of a toy truck adapted for and depicted as riding on said highway Figures 7 and 8 are top views, partially cut away, of the same toy truck, and Figures 9 and 10 are bottom views thereof, Figure 9 being partially cut away to show underlying details. A cross-sectional end view of a portion of the truck and highway roadbed is presented in Figure 11 to show details of the guiding means, while a perspective view of one plate of the guide means is illustrated in Figure 12.

Figure 13 shows a plan view of a merging road intersection, with details of the underlying switching mechanism illustrated in cut-away plan view in Figure 14, and bottom view in Figure 15. A cross-sectional view of the roadbed with the switch in two different positions is illustrated in Figures 16a and 16b.

A plan view of a road intersection is shown in Figure 17, a bottom view of which is presented in Figure 18.

Figure 19 is a diagrammatic presentation of the electrical connections for the crossing in Figure 17 as well as the stoplight connected therewith. A diagrammatic presentation of the electrical connections for the merging intersection of Figure 13 is illustrated in Figure 20. A cross-sectional vertical view of one type of light system applicable for the circuits in Figures 19 and 20 is depicted in Figure 21. Figure 22 shows semi-diagrammatically, the electrical circuit employed in the truck illustrated in Figures 7, 8, 9, etc. A cross-over circuit section to maintain polarity in intersecting roads and road section therefor is shown in Figures 23a (top view) and 23b (bottom view). A portion of an insulating road section end connection means adapted to isolate electrically a section of the roadbed to enable control by means of wired circuits to said isolated electrical section by de-energizing or energizing for stopping vehicles thereon or allowing them to proceed, is illustrated in Figure 24.

Roadside furnishings are shown in Figure 25, while Figures 26 and 27 illustrate how such furnishings may be attached to the roadbed. Figures 28 and 29 illustrate different means for mounting decorative or collateral material. An overpass roadbed is illustrated in Figure 30, while Figure 31 shows a turntable switching means for the roadbed.

A top or plan view of a modified form of roadbed section for working additional circuits in the vehicle or for operating more than one vehicle in parallel lanes on the same roadbed is depicted in Figure 32, while Figure 33 shows a bottom view of an end portion thereof with some electrical connections. A cut away perspective end view of a two-guide road is shown in Figure 34. Figure 35 illustrates a similar view of a portion of the roadbed shown in Figure 32. A top view of another modification of a portion of a multi-plate doubleguide roadbed is presented in Figure 36.

Figure 37 shows a cross sectional view of a multiple-plate roadbed, such as that in Figure 32, with the vehicle thereon and a separate circuit therein being actuated, while Figure 38 is a similar view showing another circuit being actuated by another plate on the roadbed. A cross-sectional view of the roadbed shown in Figure 37 is depicted in Figure 39 showing how the friction driving wheel on the vehicle travels over the raised road plates. Other modified means for actuating circuits within the passing vehicle are shown in the side views in Figures 40 and 41.

Figure 42 illustrates a side view of the front portion of the trailer-truck adapted to be electrically uncoupled by energy from a raised roadbed plate, while Figure 43 is a similar view in which the truck cab has been uncoupled from the trailer. In Figure 44 a similar view of the truck cab shows a horn therein to be blown by energization from an elevation on the roadbed, while Figure 45 is a fragmentary cross sectional side view of the vehicle showing a preferred contact means for effecting electrical contact with a raised roadbed plate. Similar numerals refer to similar parts in the various views. Although electrical motivation is shown in the drawings, mechanical motivation may be employed by making changes apparent to those skilled in the art.

Referring again to the drawings, Figure 1 depicts a road system comprising straight sections 1, curved sections 2, merging intersections 3 and crossing 4 of the road which is made of two oppositely electrically charged flat metal strips 5 and 6 separated by narrow separation or air space 7. Lights in towers 8, 9, 10 and 11 serve as highway traffic lights for the merging intersections, while light tower 12 serves to house a stop-light for the crossing 4. The roadbed is connected through a voltage-reducing transformer to a source 13 of current by means of plug and cord 14. The whole system may be mounted on board 15 which may carry buildings 16 and other ornamental material.

The roadbed is constructed of a rigid insulating base material in end portion strips 19 and 19' (Figure 2) joined at the inner portion at 20. The insulating base 19 preferably is made from sheet which is perforated with end perforations 26 serving as the base source of separation 7. Joining portions 20 of the insulating material serve to keep the base as a single intact unit. The insulating material 19 may be plastic or fiberboard sheet or the like. Each end double strip 19—19' of insulating sheet is covered with a separate chargeable sheet metal roadbed 6 and 5. Roadbed sheet 6 (Figure 2), for example, consists of a preferably flat top roadbed sheet 6 and sides 17, the latter being provided with lateral internally directed grooves 16 under which is inserted insulating sheet 19. Grooved ridges 16 serve as supports and as limiting means for insulating sheet 19, thus providing a defined hollow portion 24 between metal sheet 6 and insulating sheet 19 to serve as holding means for joining prongs, switching means, and the like. The bottom portion 17a of sides 17 are bent in the form of a lip 18 for holding insulating sheet 19 in place, and lower metal sheet 29 may be interposed between opposite lips 18 and preferably soldered thereto to insure adequate electrical connecting means.

The other adjacent side of the roadbed is similarly provided with top sheet metal strip 5 having downwardly bent sides 17' with internally directed grooved ridges 16' and laterally internally bent lips 18' projecting from lower portion 17'a of side 17'. Road base 5' connecting with road base 5 (Figure 2), has a projecting metal strip or prong 28 (shown in bottom view in Figure 3) inserted in hollow portion 24' and held in place by ridge 16', the prong fitting into the hollow portion under strip 5 and is joined electrically therewith. It will be observed that the sheet metal road 5' or 6' above the inner connected base portions 20 (Figure 2) and between the road ends, which are the portions other than the split or separated ends 19 and 19', etc., has its sides 17' bent inwardly over base 21 to form oppositely disposed inwardly directed lips 22 (bent at groove location 16'), serving as a support for the road 5' and the truck weight imposed thereon.

It is apparent, therefore, that the roadbed consists of an insulating base 19, 21, etc. with a series of connected inverted U-shaped adjacently-disposed separately mounted flat conducting strips 5, 6, 5', 6', etc., serving as the road or highway and separated by a narrow continuous separation or air space 7 of about 1/16" width. Each of the adjacently disposed parallel strips 6 and 5 are oppositely charged or electrified to serve as electrical pickups for the vehicles riding on road surfaces 6 and 5. This is accomplished as shown in Figure 4c by soldering conductive sheet 31 to sheet 29' under insulating bases 21 and 20 and attaching electrical terminal 33 thereto. Similarly, conductive sheet 30 is soldered to plate 29 under the other roadbed and insulating base 21 and connected to electrical lead 32. This makes one road strip (5) charged positive, and the other (6), charged negative, or vice versa. Connecting projections 28 and 27 (Figure 2), may be inserted in opposite ends of the road as depicted in Figure 4a. These strips of roadway may be connected together with straight portions 1 and arcuate portions 2 (Figure 1) to produce a continuous electrically charged roadbed. Electrical outlet lug 34 (Figure 4c) may be provided for other electrical connections, if desired. The lug 34 also may be employed for fastening the roadbed on another base.

The vehicle to be driven over this roadbed preferably is a highly articulated one, such as that depicted in Figures 5 to 10. Cab 35 is mounted over chassis rod 36 on the ends of which are swivably mounted (or swiveling knuckle-mounted) front axle 37 at point 50 (Figure 9), and second axle 38 swiveling at point 49. Front wheels 39 and 39' mounted on each end of shaft 37 are of metal so that they make conductive contact with adjacently disposed road portions 5 and 6 separated by evenly spaced separation 7. Attached to axle 37 by screws 41 (Figure 10) is guide assembly 40, the lower portion of which rides in separation 7 and serves to guide that portion of the truck which the axle carries.

At the juncture 49 (Figure 9) of chassis rods 36 and 42 and swivably mounted thereat is axle 43 carrying, on its extremities, wheels 44, 45, 46 and 47, which are preferably rubber covered. At the center of this axle also, is mounted another guide assembly 40. Chassis rod 42 is swivably mounted at point 48 (Figure 9) under the trailer body 49. At this point, axle 51 is swivably mounted thereunder, carrying wheels 52, 53, 54, 55 on its ends which preferably also are rubber covered. Another guide assembly 40 also is mounted under the middle portion of axle 51.

At the tail end of trailer body 49 is the end of chassis rod 56 which is swivably mounted at point 57 of crossarm 58 (Figure 9) attached to the bottom of trailer 49 by bolts 59. Thereunder, swivably attached, is axle 60 on the ends of which are mounted metal outer wheels 61 and 62 and insulated rubber or plastic wheels 63 and 64. At the bottom central portion of axle 60 is mounted another guide assembly 40. Finally, at the other end 70 of chassis rod 56 is, swivably mounted, rear axle 65 carrying, on its ends, rubber covered wheels 66, 67, 68 and 69. On the bottom central portion of axle 65 is mounted the last guide assembly 40.

It will be observed in Figure 11 that a helical spring 315 (or other vertically resilient member such as a strip of sponge rubber, for example) is disposed over axle 60 to allow for vertical movement of the wheels to conform to any irregularity present on the roadbed.

Details of the guide means or guide assembly exemplified by the one on axle 60 are depicted in cross-sectional view in Figure 11. It will be observed that this means consists of a pair of flat metal plates 71 (Figure 12) about one inch long, separated by insulation 72 and mounted upon axle 60 via insulating screws 73 inserted through holes 74 in the bent upper portion 75 of the strip. These metal strips 75 also are insulated by insulation 76 from shaft 60 as will become apparent hereafter. Plates 71 are provided with end prongs 77 and 78 projecting down about 3/16" and projecting into air space 7 between road plates 5 and 6 to serve as the guiding means for forward and backward travel of the vehicle.

In the cases where the wheels pick up the current from the charged road plates 5 and 6 (such as bare wheels 39, 61 and 62), an insulated axle is employed, such as axle 60 (Figure 11). In this case, a portion of the metal axle is insulated from the rest of the axle by insulation 79 and 89, enabling the current to be taken through wires 80 and 81 to the motor 82 (Figure 8) of the truck without shorting. Actually, it is only necessary to carry current through one of the front wheels and one of the rear wheels, to centrally disposed motor 82 which is geared to a rubber friction drive wheel 83 which contacts the road by straddling the central air space 7 (Figure 6). Bolt 84 (Figure 11) acts as the swiveling center for axle 60 and chassis rod 56.

The electrical connections in the truck are depicted diagrammatically in Figure 22. It will be noted that positive current is picked up from road plate 5 from leads 14 by bare wheels 39 and 61 (or other contacting means) to axle portions 37' and 60', respectively, from which wires 85 and 86 pick up the current and lead it to terminal 87 of the motor 82. Likewise, bare wheels 39' and 62 discharge current to negatively charged road strip 6, leading to axle portions 37 and 60, respectively, feeding the current through wires 90 and 91, respectively, from terminal 92 of motor 82. Headlight 93 and other lights 94 and 95 are connected to the circuits by wires 96, 89, 97, etc. in the conventional manner.

A road structure adapted for a merging intersection is shown in Figure 13. In this case, the straight portions of road 1 connect with the intersection portion 3, as will be outlined. It will be observed that main intersection elements 100, 103, 104 and light base 10 are all mounted on insulating base section 113, as are elements 98, 102, 106 and 107. Prongs 28, 101, 105 and 112 are conductive and of the same type as that shown in Figure 2, but prong 108 is made of plastic or other insulating material, as shown in Figure 24. This prong has a cut out portion 99 which serves as a holding means for metal contacting strip 109 wrapped and soldered around portion 118 of prong 108. Prong 111 also is of insulating plastic and has similarly mounted thereon metal contact 110. These metal contacts 109 and 110 are used for connecting on wires which are shown diagrammatically in Figure 20 and which are led to other connections in the intersection. It is apparent that when an insulating prong such as 108 is employed, the metal plates 102 and 6 are kept out of electrical contact with each other at the joint between both plates.

Figure 15 shows the bottom of the intersection depicted in Figure 13 (without connecting wires), while Figure 14 shows the switching mechanism mounted within the hollow portion 24 (Figures 2, 16a and 16b) between the metal road plates 5 (in this case 100, etc.) and insulating base 113. It will be observed in Figure 14 (which depicts the cutaway plan view) that switching arm 120 pivoted at 121 is solenoid-operated through arm 122 (the solenoid is shown in Figure 20). Arm 122 is swivably connected to end 123 of switching arm 120 at point 124. When the switching arm 120 is in the position indicated in Figure 14, the truck whose guide assemblies 40 are riding in air space 7 from top down, would be guided according to the arrow into air space 7a by curved edge 125 of switching arm 120, as shown in cross section in Figure 16a. When solenoid arm 122 is moved to the right, straight edge 126 of switching arm 120 would be in line with the right hand edge of air space 7, so that the truck guide assembly 40 would be guided straight through down air space 7, as shown in Figure 16b.

In the merging intersection depicted in Figure 13, joint 116 is a plain connection between two small strips of road. One large strip embodying strips 98 and 100 would accomplish the same purpose.

Figure 20 shows the electrical diagram for the operation of the merging intersection illustrated in Figure 13. It will be observed that when double acting solenoid 162 (by means of a switch, not shown) causes arm 122 to move to the right to move switch arm 120 as shown (enabling the truck coming from the top to move straight down air space 7), the contacts of switch 155 are moved as in the position shown, resulting in the connecting of the third, fifth and seventh contacts (counting from the top). This causes strip 107 to be de-energized and also connects strip 102 and 103 with 104. Also, this causes traffic signal light bulb 119 to light in tower 10 behind the left green lens and the right red one. The two middle lenses are amber and serve as dummies.

When solenoid 162 is actuated so that arm 122 is moved to the left in Figure 20, switch arm 120 is moved to guide the truck along air space 7a. In this case, switch 155 pivoted at point 161 causes the first and second contacts to be connected and also connects the fourth contact with the sixth. This de-energizes strip 102 and connects strips 98 and 100 with strip 103, giving the latter the opposite polarity to enable current to flow to strip 106. Strip 107 is energized. Also, the upper traffic signal light 156 in tower 10 is lighted which has a red lens on the left and a green one on the right.

A highway crossing 4 (Figure 1) is shown in plan view of Figure 17. A bottom view thereof is shown in Figure 18 with the wiring removed. Strips 130', 129', etc. in the center of the bottom view are metal strips connecting with the corresponding top road plates and serving as connecting means onto which electrical connections may be soldered. Figure 19 illustrates a circuit diagram for the crossing, with element 170 being the switch contact plate swiveling at point 159, the contacts also being depicted in the figure as being connected by wire to the various numbered elements, such as underneath insulating base 148.

When solenoid 160 is actuated by energizing it through lines 157 and 158, switch base 170 is turned so that the second, fourth, sixth and eighth contacts (counting from the top) are connected. Also, the tenth, twelfth and fourteenth contacts are connected together. Strips 137, 135, 133 and 129 will then be of one polarity, while strips 138, 136, 134, and 130 will be of the opposite polarity. Strips 127 and 131 will be de-energized, causing vehicles traveling on those strips to stop. As the vehicle approaches in the direction of the arrow in Figure 19, one light 156 in tower 12 will light behind a red lens.

When solenoid 159 is actuated by energizing it through lines 156 and 157, switch base 170 is turned so that the first, third, fifth, and seventh contacts are connected together. Also, contacts nine, eleven and thirteen are connected together, causing strips 127, 133, 134 and 131 to be of one polarity and strips 128, 135, 136 and 132 to be of the opposite polarity. Strips 137 and 129 will be de-energized so that vehicles traveling on the latter strips will be behind the green lens which is the top lens in that series.

It will be apparent from Figure 1 that when a turn is made by a truck from say strip 1' to, say strip 210, the right hand road bed of strip 210 will be of a polarity different than that when the truck reaches strip 1" at the opposite side. Accordingly, provision must be made to reverse the polarity of the adjacent strips, which is done at points 211 and 212. The manner in which this is done is depicted in Figures 23a (top view) and 23b (bottom view). It will be observed that plates 211a and 211b (which are separated by the air gap 7) are separated from the other plates by an insulating strip 213 which insulates plate 211a from 211c and 211b from 211d. Also, the conductive portions of the four plates adjacent to insulating strip 213 are cut away from the edge of air space 7 sufficiently to avoid contact with metal guide plate 71 (Figure 11) as it travels in air space 7. The cut out portion is substituted by insulating plastic strips 214 and 215 to facilitate ready maneuverability of guide 40 in air space 7.

The underside (Figure 23b) is provided with a crossover electrical connection such as insulated wire 216 having its ends soldered to leads from plate 211b and plate 211c. Also, plates 211a and 211d are similarly connected.

With respect to the guide assembly 40 (Figure 11), it is felt that a pair of strong but flexible metal plates 71, separated by an insulator, such as glass fiber-resin laminate 72 provides a strong, adequate and durable guiding means for vehicles of heavy weight which impose particular stress and strain on these guide members. However, the use of strong but flexible guiding means made entirely of insulating plastic is not precluded and materials such as laminated phenol-formaldehyde and glass fiber-resin laminate can be employed for reasonable periods prior to replacement.

It is also understood that although a single vehicle lane system has been disclosed herein, it is apparent from the disclosure made herein that a double or multiple lane system (such as that depicted as 300 in Figure 1) can be provided, enabling vehicles to move in opposite directions, by paralleling the roads and providing the necessary crossings or intersections as would be apparent from the disclosure herein.

As is apparent from Figure 18, the overlapped fastening of the plates over base 148, as depicted by 18' can be employed within the inner part of base 148 as at 130', 129', etc., merely by cutting out the necessary slots 20 needed for the overlapping operation with sides 17 of the plates.

The structure of the guide means is important in that considerable difficulty has been encountered in the jamming of the strip within the groove or air space.

Some additional features of the driven vehicle shown in Figure 6 include pivoting means 180 for the motor 82, enabling friction drive wheel 83, centrally disposed with respect to adjacent plates 5 and 6, to move some distance vertically to insure a positive drive on an uneven surface and, by adding weight of the motor on the road, provides better traction. In Figures 7 and 8, rear light 95 is mounted in the center of a polished reflecting area 181. Openings 182, 183, etc. are provided in the body to allow the reflected light to shine therethrough to serve as lights. Similarly, light 94 in reflective area 184 serves to feed light through openings 185, 186 in a similar manner. The same is true with front light 93 in polished area 187 which directs reflected light through openings 188 to serve as headlights.

Figure 25 shows how various decorative accessories may be employed with the system of the present invention. The plastic base 19 under the roadbed 5—6 may be extended at the sides, making available extensions 190 and 191 on which may be applied simulated grass 192, road intersection and switch 193, trees 194, hedges, and the like. Trees and similar articles requiring lighting or activation may be plugged into the base as shown in Figure 28 or screwed in as in Figure 29. Extensions 190 and 191 may be separate units which may be attached to base 19 by a joint as in Figure 26 or by electrical plugs as in Figure 27, which can serve as feeders for electrical equipment.

Figure 30 shows another arrangement wherein a road 195 serves as an overhead crossing for another road 196 in tunnel 197.

A turntable arrangement for a road crossing or turn is illustrated in Figure 31. Here, switch 198 may be turned to serve as a feeder for any one of the four roads leading to it. The merging intersections 199, 200, etc. are provided with switching means similar to those of Figure 13.

As is apparent from Figure 38, it is possible to have the vehicle axle 301 to carry more than one guide assembly, such as guide assemblies 40' and 40", each of which would ride in corresponding air spaces 7b and 7c respectively.

It is also possible to actuate or energize separate electrical circuits within the passing vehicle by use of a multiple plate roadbed, such as that depicted in Figure 32. In this case, the roadbed section 302 between joints 303 and 304 may be substituted for one of the sections in the road system illustrated in Figure 1. For example, it could be substituted for section 1' of the roadbed. In Figure 32, plates 5 and 6 form the conventional roadbed in which air space 7 is the recipient for the guide assembly 40 of the vehicle. Section 302 of the roadbed connected thereto comprises flat narrow outer plates 305 and 306 on which ride the wheels of the vehicle. Adjacently disposed, are narrow plates 307, 308, 309 and 310 which are separately insulated by parallel air spaces from the other plates and non-conductive prongs from plates 6 and 7. All of the strips have correspondingly numbered connecting prongs 306', 310', 309', 308', 307' and 305'. Prong 305' (Figure 33) is in electrical contact with strips 6, while prong 306' is in electrical contact with strip 5. The other prongs are insulated from plates 5 and 6. Plates 310, 309, 308, and 307 are conductively connected through conductive strips 311, 312, 313, and 314, respectively to circuit and switching means 315 used for mechanically energizing any or all of said strips by current from a transformer or from plates 305 or 306, as desired. It is apparent that prongs 306', 310' and 309' fit into the hollow portion under plate 5, while prongs 308', 307' and 305' fit into the hollow portion under plate 6. The other ends of plates 306, 307, 308, etc. are similarly provided and connected.

Inside plates 307, 308, 309 and 310 are provided with elevated or raised surfaces 316, 317, 318, and 319, respectively which are connected to the lower plate surfaces 307, 308, 309 and 310, respectively (which are of the same height as plates 5 and 6) by inclined planes 320, 321, 322, and 323 on one end and 324, 325, 326 and 327 on the other ends, respectively, as is depicted in greater detail in Figure 35. In this case, plate 328 would be similar to plate 305 and plate 330 similar to plate 316, with inclined plane 329 resembling 320, and plate 334 resembling plate 307. Inclined plane 331 on plate 332 would resemble 326 on plate 309, etc.

Over each of the four inner plates 307, 308, 309 and 310 (Figure 32) would ride a contact strip such as strips 334 and 335 (Figure 38) or 336 (Figure 45) mounted on one or more axles of the passing vehicle and connected to a circuit on said vehicle for operating horn 337 (Figure 44), for example, or uncoupling solenoid 338 (Figure 42). As the vehicle rides on strips 5—6 (Figure 32), one or more of the downwardly disposed contacts 334, etc. will touch and rub against the elevated plates 316, 317, etc., which, if they are mechanically energized through circuit and switch 315 (Figure 33), will complete the circuit in the vehicle to actuate or blow said horn, etc., the duration of the activation being determined by the length of the raised plate portion 316, 317, etc. during which electrical contact is maintained with the special vehicle circuit through contacts 334, etc. which are connected to said circuits by wires 339, 340, 341, etc. Figure 39 depicts the manner in which drivewheel 83 of the vehicle can climb to the raised surfaces 316, 317, etc. of the raised plates by way of the inclined planes 320, 321, etc. These inclined plane surfaces 324, 325, 327, 329, etc. are adapted to facilitate climbing thereon of the vehicle drive wheels, such as wheel 83, it being understood that the hinging of the drive wheels at pivot 180 allows sufficient play for the drive mechanism to move the necessary distance without lifting of the vehicle wheels from the outer plates unless it is so intended.

The roadbed depicted in Figure 34 may be wide enough to enable two vehicles to ride thereon side-by-side. For example, outer plates 345 and 346 can be charged positive and inner plate 347 charged negative. One vehicle can travel with its guide riding in air space 7d, while the other vehicle can ride with its guide 40 in air space 7e.

The roadbed depicted in Figure 36 may be adapted to be used for vehicles with two guides (as those shown in Figure 38) in which case the wheels of the vehicle would ride on outer plates 348 and 349, and inner plates 350, 351, 352 and 353 could be used as energizing means for energizing separate circuits in the vehicles as already outlined. The guide assemblies would ride in air spaces 7f and 7g, as in Figure 38.

Figure 37 shows the contacting of the vehicle with the elevated plate 343, through contact 334, when a single guide means 40 is used, as in Figure 11.

Another contacting means for intermittent activation is shown diagrammatically in Figure 40. Brush 354 made of conductive bristles carried by the vehicle rub over raised plate 355 which is covered at intermittently spaced portions 356 with insulating material. For example, horn 337 would blow as brush 354 passes over metal surfaces 357, but not when over insulation strips 356. Also, as in Figure 41, when contact 335 (connected to the vehicle) passes over long raised conductive portion 358 on roadbed 355, the horn will blow a long period, then it will blow a short period when contact 335 again touches short raised portion 359, etc.

The manner in which a truck cab may be uncoupled is illustrated in Figures 42 and 43. In uncoupling vehicles it is necessary to have the driving motor in the cab, driving friction drive wheel 360, the driving mechanism being pivoted at 361, and the other motor in the trailer driving friction drive wheel 83 and whose driving mechanism is pivoted at 180 showing that the vehicle may be driven at different ends and that two motors may be used on steep hills or uneven surfaces, the second motor operating on the same or separate circuit as desired. Solenoid 338, which is connected to a separate circuit in trailer 49, is adapted to lift coupling pin 362 acting as a swivel in this case and fitting in hole 363 of arm 364 projecting behind cab 35. As cab 35 begins to straddle inner-disposed raised plate 365, sliding contact 336 makes electrical contact with separately energizable plate 365, and, if said latter plate is energized by separate means (as 315 in Figure 33), horn 337 may be made to blow if it is connected to the separate circuit in the cab. Also, as trailer 49 straddles the other raised plate 366 which is separately energizable, and as said plate is contacted by a contacting means (not shown) under the trailer (and similar to 336), solenoid 338, electrically connected by a separate circuit to said contacting means, can be actuated by energizing inner raised plate 366, causing coupling pin 362 to be raised, thereby effecting the uncoupling operation, leaving cab 35 uncoupled as in Figures 44 and 45. Obviously, coupling may be accomplished in a reverse manner.

I claim:

1. A road system for a driven scale model automotive vehicle provided with at least one swiveling axle and vertically directed guide means centrally attached to the bottom of said axle, comprising a joinable series of a pair of parallel plates disposed alongside each other substantially in the same plane and separated from each other, a uniform narrow air space disposed continuously between said plates for the entire length of the road system and serving as the separating means, a rigid insulating sheet base disposed under said plates and adapted to serve as a mounting therefor whereby an automotive vehicle may be driven on said plates with wheels straddling said air space, said air space being adapted to receive said guide means in a manner so that said guide means ride within said air space between said plates during the entire trip of said vehicle on said road system, each of said plates having downwardly directed sides which penetrate said base at the mounting of said plate, inwardly directed lips extending from the sides of said plate and bent under said base and adapted to serve as fastening means for said plate, and lips extending from the sides of said plate and bent inwardly over said base and adapted to serve as vertical limiting means for said base and as means forming a hollow space between said plate and said base.

2. A road system for electrically driven scale model automotive vehicles according to claim 1 in which said plates are disposed to form a merging intersection in which the air space between a row of straight parallel plates intersects a curved air space between other plates, a laterally swivable switching arm disposed under said plates at said intersection, means for moving said arm laterally to effect switching of the guide means carried by a propelled vehicle from one air space to the other, electrical switching means to de-energize a plate on the switched-off road to stop vehicles traveling thereon and simultaneously energize a plate on the switched-on road and means coacting with said electrical connecting means adapted to provide correct polarity for the plates of the switched-on road.

3. A road system for electrically driven scale model automotive vehicles according to claim 1 in which said plates are disposed to form a highway crossing in which the air space between a row of straight parallel plates intersects another air space between a row of straight parallel plates, switching means coacting with said electrical connecting means to de-energize a plate on each side of the intersection at one time to stop vehicles traveling thereon and simultaneously electrically energize similar plates on the other road at each side of said crossing, and means coacting with said electrical connecting means adapted to provide correct polarity for the plates of the road on which said plates were energized.

4. A road system for a driven scale model automotive vehicle provided with at least one swiveling axle attached to the bottom of said axle, comprising a joinable series of a pair of parallel plates disposed alongside each other substantially in the same plane and separated from each other, a uniform narrow air space disposed continuously between said plates for the entire length of the road system and serving as the separating means, a rigid insulating sheet base disposed under said plates and adapted to serve as a mounting therefor whereby an automotive vehicle may be driven on said plates with wheels straddling said air space, said air space being adapted to receive said guide means in a manner so that said guide means ride within said air space between said plates during the entire trip of said vehicle on said road system, each of said plates having downwardly directed sides which penetrate said base at the mounting of said plate, lateral inwardly grooved ridges disposed in said sides immediately above said base to serve as limiting means for said base near the mounting of said plates, inwardly directed lips extending from the sides of said plate and bent under said base and adapted to serve as fastening means for said plate and lips extending from the sides of said plate and bent inwardly over said base and adapted to serve as additional vertical limiting means for said base and as means forming a hollow space between said plate and said base.

5. A driven scale model automotive vehicle and road system comprising a joinable series of a pair of parallel plates disposed alongside each other substantially in the same plane and separated from each other, a uniform narrow air space disposed continuously between said plates for the entire length of the road system and serving as the separating means, a rigid insulating sheet base disposed under said plates and adapted to serve as a mounting therefor whereby an automotive vehicle may be driven on said plates with wheels straddling said air space, said air space being adapted to receive the hereinafter-mentioned guide means in a manner so that said guide means ride within said air space between said plates during the entire trip of said vehicle on said road system, each of said plates having downwardly directed sides which penetrate said base at the mounting of said plate inwardly directed lips extending from the sides of said plate and bent under said base and adapted to serve as fastening means for said plate, lips extending from the sides of said plate and bent inwardly over said base and adapted to serve as vertical limiting means for said base and as means forming a hollow space between said plate and said base, an automotive vehicle having a chassis and adapted to be driven on said plates and having wheels straddling said air space, at least one swiveling axle attached to said vehicle and carrying wheels, vertically directed guide means centrally attached to the bottom of a swiveling axle, flexible extensions projecting downwardly from each end of said guide means and adapted to ride in said air space below the plane of said plates, a centrally disposed friction wheel drive straddling adapted to be disposed on said plates for driving said vehicle by traction, hinging means connecting, in vertically hinging relation, said drive to the chassis of said vehicle to allow some vertical motion of said drive independent of the motion of said vehicle, and motor means in said vehicle adapted to pick up a charge from said plates for driving said friction wheel drive.

6. A driven scale model automotive vehicle and road system comprising a joinable series of a pair of parallel plates disposed alongside each other substantially in the same plane and separated from each other, a uniform narrow air space disposed continuously between said plates for the entire length of the road system and serving as the separating means, a rigid insulating sheet base disposed under said plates and adapted to serve as a mounting therefor whereby an automotive vehicle may be driven on said plates with wheels straddling said air space, said air space being adapted to receive the hereinafter-mentioned guide means in a manner so that said guide means ride within said air space between said plates during the entire trip of said vehicle on said road system, each of said plates having downwardly directed sides which penetrate said base at the mounting of said plate, inwardly directed lips extending from the sides of said plate and bent under said base and adapted to serve as fastening means for said plate, lips extending from the sides of said plate and bent inwardly over said base and adapted to serve as vertical limiting means for said base and as means forming a hallow space between said plate and said base, and a flat prong projecting from the hollow space of one plate, said prong being adapted to fit tightly within the hollow space of another plate end, whereby a road joint is produced.

7. A driven scale model automotive vehicle and road system according to claim 6 wherein the prong is conductive and is in conductive contact with a plate.

8. A driven scale model automotive vehicle and road system according to claim 6 wherein the prong is non-conductive, and conductive connecting means attached thereto adapted to connect to another part of the road system a plate joinable to said prong.

References Cited in the file of this patent

UNITED STATES PATENTS

| | | |
|---|---|---|
| 1,303,117 | Roe | May 6, 1919 |
| 1,810,250 | Loving | June 16, 1931 |
| 1,856,991 | Franklin | May 3, 1932 |
| 2,068,403 | Ekstrom | Jan. 19, 1937 |
| 2,112,072 | Cullen | Mar. 22, 1938 |
| 2,133,194 | Horn | Oct. 11, 1938 |
| 2,166,752 | Cullen | July 18, 1939 |
| 2,171,634 | Rexford | Sept. 5, 1939 |
| 2,537,281 | Roshak | Jan. 9, 1951 |
| 2,804,543 | Petrick | Aug. 27, 1957 |